United States Patent Office 3,515,736
Patented June 2, 1970

3,515,736
PROCESS FOR REMOVING AFLATOXIN FROM PEANUTS
Leo A. Goldblatt and James A. Robertson, Jr., New Orleans, La., assignors to the United States of America as represented by the Secretary of Agriculture
No Drawing. Filed Apr. 13, 1965, Ser. No. 447,922
Int. Cl. C11b 1/10
U.S. Cl. 264—412.4          1 Claim

ABSTRACT OF THE DISCLOSURE

A fungi-related toxic material, aflatoxin, is removed from essentially oil-free peanut meal by extracting the meal with the azeotropic mixture of acetone, hexane, and water boiling at 48° C. under standard conditions until an extract thereof, when subjected to thin layer chromatography employing Silica Gel G, shows no fluorescence under ultraviolet light of wave length 365 m$\mu$.

---

A non-exclusive, irrevocable, royalty-free license in the invention herein described, throughout the world for all purposes of the United States Government, with the power to grant sublicenses for such purposes is hereby granted to the Government of the United States of America.

This invention is concerned with the toxic materials proliferated as metabolites by certain types of fungi which types may contaminate peanuts harvested, cured, or stored under other than desirable conditions. More particularly, this invention relates to an extraction process designed to remove fungi related toxic materials, if these toxic materials are present in the peanuts, together with the peanut oil.

The extraction process that is the object of this invention is operable of itself for the removal of fungi related toxins and is operable for the concurrent removal of the peanut oil. Alternatively, the herein disclosed extraction process can be used as an adjunct to conventional oil extraction processes since the process of the present invention is entirely compatible with conventional processes for removing oil from peanuts whether the conventional process be exclusively a solvent extraction process, a pressing process, or a combination of both these processes. It should be noted in the case of simultaneously oil and toxin extraction, that once the fungi related toxin is removed from the peanuts and is copresent with the extracted peanut oil, no serious toxicity problem exists since conventional alkali refining and bleaching of the peanut oil will completely remove the toxic material from the oil.

A relatively few members of the mold genus Aspergillus produce toxins that for convenience are grouped collectively under the heading aflatoxin. It is the opinion of some investigators that no more than about 10% of the hundreds of strains of *Aspergillus flavus* are toxigenic (i.e., produce aflatoxin). Other investigators believe that under certain conditions (i.e., conditions propitious for toxin production), any strain of *Aspergillus flavus* may produce aflatoxin. In any event, aflatoxin is known to be lethal in minute quantities to fish and to poultry, is known to affect adversely swine and cattle, particularly the immature animals, and in addition aflatoxin is known to produce cancers in rats that have been subjected to long term feeding of contaminated peanut meal. Ducklings which are particularly susceptible to aflatoxin are preferred for biological assay purposes and it has been estimated that one ounce of aflatoxin suitably distributed would suffice to kill a million ducklings.

The causative factor for the so-called turkey X disease was ultimately traced to fungi contaminated peanut meal. Contaminated peanut meal has in the past caused the death of large numbers of farm animals. This fact is not only of concern to the animal feed industry but it is also important in connection with international protein-food efforts as peanut meal serves as the protein concentrate for many proposed diets in protein deficient areas. It is essential that aflatoxin, if present, be removed before the meal is used for animal feeding or for human consumption; but the customary methods of processing peanuts for the removal of the peanut oil (mechanical expression or extraction with hydrocarbon solvents), leave aflatoxin unchanged in the residual meal or cake. Heating is known to be ineffective for deactivation.

The contamination of peanut kernels with aflatoxin is not normal. The following facts which bear on the fungal contamination of peanuts have been established:

(a) toxins of fungal origin are virtually never present in peanut kernels at the time of harvest;

(b) contamination with fungi and the subsequent appearance of toxins in peanut kernels does not occur until several days after the peanuts have been harvested;

(c) molds contaminate and grow most successfully on dead or damaged plant tissue;

(d) the relative humidity and tissue moisture values are known below which fungal contamination with accompanying aflatoxin production is unlikely. The growth of fungi, particularly fungi of the Aspergillus type, does not occur on peanut kernels the moisture content of which is below about 9 weight percent. Nine percent moisture in the peanut kernel reflects an equilibrium moisture content with the surrounding atmosphere equivalent to about 80% relative humidity. It is evident that the practice of good harvest, cure, and good storage techniques is essential.

The process that is the subject of this invention consists of extracting peanut kernels with a ternary solvent mixture of acetone, hexane, and water. The solvent mixture is prepared by mixing and distilling about 44 parts of acetone, 55 parts of hexane, and 4 parts of water. An azeotrope boiling at 48° C. under standard conditions is then collected for use as the extractant. The azeotrope corresponds to the composition 42.1 volume percent acetone, 56.5 volume percent hexane and 1.4 volume percent water. A small quantity (about 2–3 percent) of water and acetone will sometimes layer out on long standing, so it is recommended that the extractant be thoroughly mixed before use.

If the peanuts being extracted by the process of this invention are unusually dry (peanut kernels below about 9 percent moisture), the peanuts will remove water from the azeotrope and cause it thereby to be less effective as an extractant. It is recommended in such an event that additional water be added to the azeotrope to compensate for water lost to the peanuts and to maintain the prescribed composition.

Extraction is continued until assay of the extracted meal no longer yields a positive test for aflatoxin by thin layer chromatography.

There are various methods available which are sufficiently sensitive to serve the needs of our process. A bioassay procedure that employs ducklings is probably the most definitive method but a bio-assay method is rather too cumbersome and time consuming for use with a commercial extraction process. A more rapid and entirely adequate method is based on thin layer chromatography as set forth below.

EXTRACTION

Weight 50 g. of a ground sample in a 100 ml. beaker and transfer to a quart size high speed blendor. Add 200 ml. of a well-mixed acetone-hexane-water azeotrope using some of the solution to clean the beaker. The azeotrope as noted above may be readily prepared by distilling a mixture of acetone-commercial hexane-water and collecting the heart cut which distills at 48° C. Alternatively, an acetone-hexane-water miscible solvent (50:48.5:1.5 v./v.) may be used. Cover and blend for 5 minutes. Alternatively, the ground sample may be extracted in a 500 ml. stoppered flask by shaking for 1 hour with 200 ml. of solvent and enough 6 mm. glass beads to cover the bottom of the flask. Transfer the slurry to a 250 ml. centrifuge bottle and centrifuge at 1800–2000 r.p.m. for 10 minutes. After centrifugation, decant the supernatant into a 250 ml. graduated cylinder. Transfer 110 ml. of the supernatant to a separatory funnel, add 50 ml. of 5% aqueous sodium chloride, shake vigorously, allow phases to separate, and draw off the lower aqueous acetone layer into a 400 ml. beaker. Repeat the extraction twice more with 50 ml. portions of 5% aqueous sodium chloride adding 35 ml. of acetone before each extraction. Discard the upper hexane layer.

Place the combined aqueous acetone extracts on a stream bath, add a few boiling stones, and evaporate to approximately 150 ml. This removes most of the acetone. Allow the aqueous extract to come to room temperature and quantitatively transfer to a separatory funnel washing the sides of the beaker with a small amount of chloroform from a wash bottle. Extract the aqueous extract two times with 50 ml. portions of chloroform shaking vigorously during each extraction. Draw off the lower chloroform layer through a bed of anhydrous sodium sulfate into a 250 ml. beaker. After the last extraction rinse the $Na_2SO_4$ with ca. 10 ml. chloroform. Evaporate the combined extracts almost to dryness. Quantitatively transfer the concentrated chloroform extract to a small beaker or flask, evaporate to dryness on a steam bath and allow to come to room temperature.

PREPARATION OF CHROMATOPLATES

Shake vigorously 50 g. of silica gel with 100 ml. of water in a stoppered flask for no longer than one minute and pour into the applicator. Immediately apply to five 20 cm. x 20 cm. clean dry glass plates using an applicator set at 500 microns. Allow the plates to set undisturbed for 2 hours. Dry the coated plates at 105° C. for 2 hours. Store in a desiccator until ready for use.

CHROMATOGRAPHY

Dissolve the residue obtained from the extraction procedure in 2 ml. of chloroform. Using a 10 µl. syringe, spot 1, 3, 5, and 10 µl. portions of this extract onto the thin layer plate.

Develop the chromatoplate immediately after spotting in an equilibrated tank with 3% methanol in chloroform. Remove the chromatoplate from the tank, allow to air dry and examine under a long wave length ultraviolet light (365 mµ.). Estimate the relative intensity of any aflatoxin versus known standards. Variants of this procedure are well known and these are equally operable for our purpose which is simply to test with confidence for the presence or the absence of aflatoxin.

As noted above a bia-assay method employing ducklings is known and is perhaps a more authoritative test albeit time consuming. Despite any shortcoming of the thin layer chromatographic test with respect to its quantitative aspects, it is reliable and sufficient for the purposes of this process since the absence of fluorescence on the developed plates signifies that the peanuts tested are free from aflatoxin. The chromatographic test is reported to be sensitive to the extent of .002 p.p.m. of aflatoxin.

Aflatoxin is known to be soluble in polar solvents such as methanol. The solubility of aflatoxin in methanol forms the basis for at least one quantitative method of aflatoxin assay. However, methanol is a poor solvent for lipids and when employed as the extractant for peanut oil extracts a large proportion of nonlipid material in addition to aflatoxin.

As an example, a commercial peanut meal extracted with methanol and assayed for aflatoxin was estimated to contain 3 p.p.m. of aflatoxin. The estimate was based on comparison of intensity of fluorescence, after the development thereof on a chromatoplate coated with Silica Gel G, with that of a reference sample. A control assay performed in the same way but with the substitution of the acetone-hexane-water azeotrope for methanol also afforded an aflatoxin assay value of 3 p.p.m. However, and this fact is of considerable importance in the instant invention, the crude primary extract obtained by extraction of the peanut meal with the azeotrope was less contaminated with extraneous material than was the primary extract obtained with methanol. The residue obtained by evaporating the methanolic extract of 100 grams of the commercial peanut meal weighed 11.5 g. whereas the residue obtained by evaporating the extract obtained with the azeotrope weighed only 3.1 grams.

Although we prefer to employ the mixed acetone-hexane-water solvent, essentially in the component ratio disclosed above (i.e., the component ratio reflected by the azeotropic mixture) we have found that increasing the amount of water in the solvent mixture over and above that amount of water present in the azeotropic mixture will enhance the aflatoxin extraction efficiency of the mixed solvent. This particular effect is shown in the following table:

TABLE I.—EFFECT OF ADDED H²O ON ASSAY OF PEANUT MEAL

| Sample size (g.) | Ml. H₂O added | Ml. of azeotrope | Extraction | P.p.b. aflatoxin | Comments |
|---|---|---|---|---|---|
| 50 | 0 | 250 | Shaker, 30 min. | 420 | |
| 50 | 5 | 250 | do | 630 | Previously assayed 600 p.p.b. |
| 50 | 10 | 250 | do | 735 | |
| 50 | 10 | 250 | do | 750 | |
| 50 | 25 | 250 | do | 600 | |
| 50 | Assayed by 70% acetone procedure | | | 765 | |

As for adding water to the azeotropic composition, there are several ancillary considerations and some discretion must be exercised.

The addition of excessive amounts of water will destroy the homogeneity of the solvent mixture, will tend to extract extraneous, unwanted materials, and will in general impair extraction operations if the concurrent removal of oil and of aflatoxin is contemplated.

The following examples will illustrate the process of our invention.

EXAMPLE 1

A quantity of whole peanuts, with sticks and stones removed, were passed through a set of cracking rolls (clearance set at 0.030 inch), cooked for 45 minutes at a temperature within the range 180° and 220° F. and finally pressed in a hydraulic press at 6,000 pounds per square inch gauge pressure. Residual oil in the pressed peanut meal was 8.53% by weight and moisture was 5.72%. The pressed peanut meal was contaminated with fungi and exhibited approximately 120 parts per billion of aflatoxin as assayed by a thin layer chromatographic technique.

Fifty grams of the contaminated peanut meal was weighed into a 500 ml. flask the bottom of which was covered with glass beads, 250 ml. of acetone-hexane-water azeotrope was then added and the flask agitated on a wristaction shaker for 30 minutes. The resulting slurry was decanted from the glass beads and centrifuged at 2,000 r.p.m. for 10 minutes. The supernatant was then removed and assayed for aflatoxin. The extracted peanut meal was transferred back into the 500 ml. flask and reextracted a second and a third time with 250 ml. portions of the azeotrope.

The results of the extractions are as follows:

Extraction #1—60 p.p.b. aflatoxin was removed calculated on basis of 50 gm. meal.
Extraction #2—30 p.p.b. aflatoxin removed calculated on basis of 50 gm. meal.
Extraction #3—19 p.p.b. aflatoxin removed calculated on basis of 50 gm. meal.

The extracted peanut meal contained 1.23 weight percent of residual peanut oil and 15.6 weight percent of water.

EXAMPLE 2

An extraction using the acetone-hexane-water azeotrope was carried out on a commercial solvent extracted peanut meal. The commercial peanut meal prior to extraction with the azeotrope was contaminated with about one part per million of aflatoxin and contained slightly over 2 weight percent of residual peanut oil and about 6 weight percent of moisture.

The contaminated meal was extracted with the azeotrope, as follows:

One hundred grams of the material to be extracted was weighed into a 60 x 180 mm. thimble and the thimble placed in a Soxhlet extractor. The peanut meal was extracted with approximately 700 ml. of the acetone-hexane-water azeotrope at a siphon rate of at least seven cycles per hour. After 6 hours extraction the Soxhlet extractor was changed and the extraction was continued with fresh solvent. Four 6-hr. extractions with ca. 700 ml. solvent were carried out on the 100 grams of peanut meal. The first extraction removed the equivalent of 675 parts per billion aflatoxin as assayed by a thin layer chromatographic technique. The second extraction removed 125 parts per billion aflatoxin, and the third extraction removed ca. 37.5 parts per billion aflatoxin. The fourth extraction removed no detectable aflatoxin, and the meal was judged free of aflatoxin.

EXAMPLE 3

While peanuts known to contain 800 parts per billion of aflatoxin were extracted with the acetone-hexane-water azeotrope for the simultaneous removal of both peanut oil and aflatoxin.

The peanuts prior to extraction contained about 50 weight percent of oil and 6 weight percent of water. Fifty grams of the finely ground peanuts was extracted four times with 250 ml. portions of acetone-hexane-water azeotrope according to the procedure of Example 1. The aflatoxin removed in Extraction 1 was 600 p.p.b.; Extraction 2—170 p.p.b.; Extraction 3—20 p.p.b.; and Extraction 4—6 p.p.b. After air drying overnight, the extracted meal contained 12.3% moisture and 2.1% oil.

We claim:
1. A process for removing aflatoxin from an essentially oil-free peanut meal containing same, comprising extracting said essentially oil-free, aflatoxin-containing meal with a ternary mixture of acetone, hexane, and water, said ternary mixture being specifically the azeotrope boiling at 48° C. under standard conditions and exhibiting the composition by volume of 42.1% acetone, 56.5% hexane, and 1.4% water, the extracting being continued until a sequentially collected aliquant of the extract, when subjected to assay by a thin layer chromatographic technique employing Silica Gel G, shows no fluorescence under ultraviolet light of wave length 365 m$\mu$.

References Cited
UNITED STATES PATENTS 3,025,314  3/1962  King et al. ---------- 260—412.4

ALEX MAZEL, Primary Examiner

A. M. T. TIGHE, Assistant Examiner

U.S. Cl. X.R.

260—412, 412.2